Figure 1:
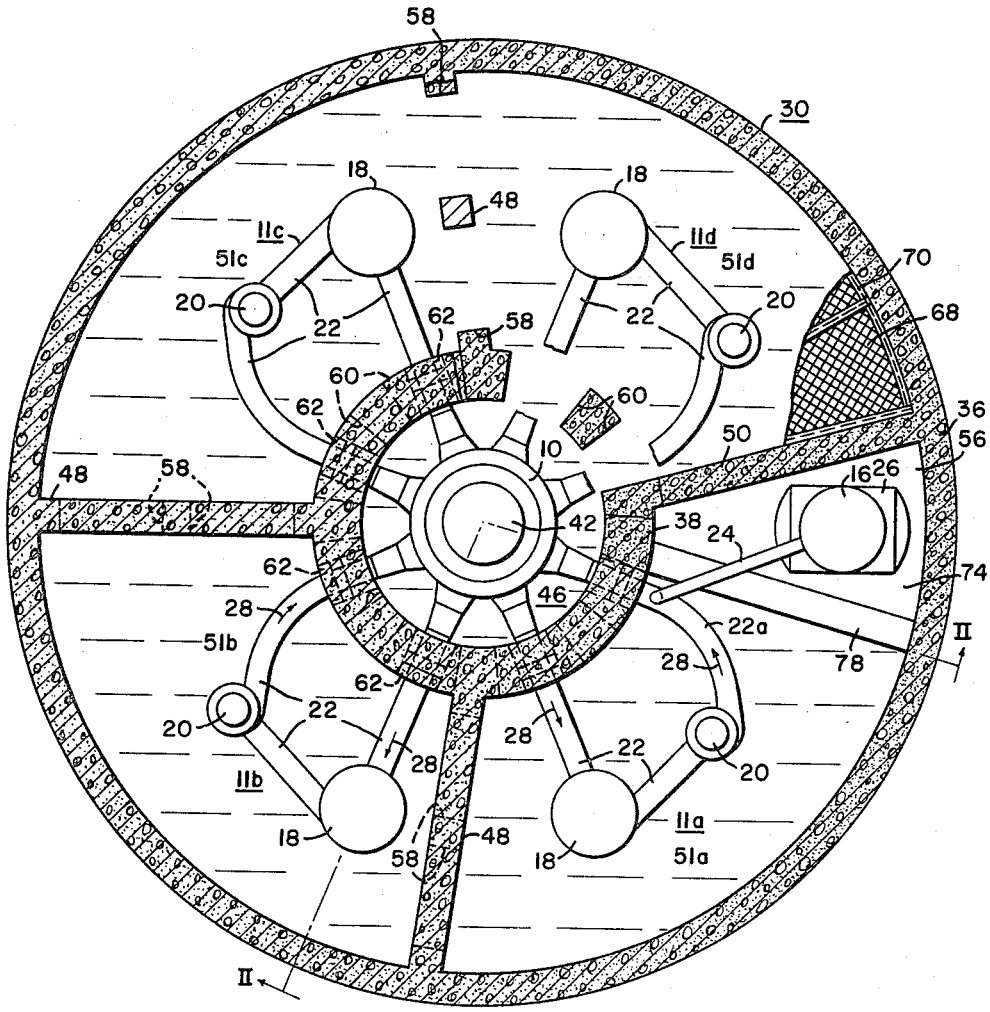

Nov. 22, 1966 W. A. WEBB 3,287,226
PRESSURE SUPPRESSING ARRANGEMENT FOR NUCLEAR REACTOR SYSTEM
Filed March 7, 1962 2 Sheets-Sheet 1

WITNESSES
John E. Heasley, Jr.
James F. Young

INVENTOR
William A. Webb
BY G. T. Stratton
ATTORNEY

Nov. 22, 1966 W. A. WEBB 3,287,226
PRESSURE SUPPRESSING ARRANGEMENT FOR NUCLEAR REACTOR SYSTEM
Filed March 7, 1962 2 Sheets-Sheet 2

United States Patent Office 3,287,226
Patented Nov. 22, 1966

3,287,226
PRESSURE SUPPRESSING ARRANGEMENT FOR NUCLEAR REACTOR SYSTEM
William A. Webb, Penn Township, Allegheny County, Pa., assignor to Westinghouse Electric Corporation, East Pittsburgh, Pa., a corporation of Pennsylvania
Filed Mar. 7, 1962, Ser. No. 178,023
8 Claims. (Cl. 176—37)

This invention relates in general to a pressure suppressing arrangement for a container or enclosure in which the pressure is derived from a release or generation of vapors from a pressurized fluid normally confined therein and more particularly to a pressure suppressing system in which condensible vapors may be released from a pressurized liquid system within enclosure.

In certain applications of the invention, the pressure-suppressing arrangement is adapted for use with a nuclear reactor enclosure which contains a reactor system using a high pressure, high temperature coolant and/or moderator, such as water, wherein a rupture would pressurize the surrounding reactor enclosure by the generation of steam produced by the flashing of the pressurized reactor water leaking into the reactor enclosure from the pressurized reactor system.

Present day design practice requires that the primary or reactor portion of a nuclear plant be contained within a sealed container to prevent the escape of fissionable material to the atmosphere in case of an accident or rupture in the primary or reactor portion of the plant, with a possible subsequent meltdown of the reactor core. For a nuclear reactor, especially of the pressurized liquid coolant type, all of the high pressure components presently are enclosed in a structure usually referred to as a vapor container. This sealed container is strong enough to withstand the developed pressure following an accident, in which the pressurized water flashes to steam. The vapor container also prevents the spread of radioactive material that the water escaping from the reactor portion of the plant may contain.

The design pressure for the vapor container is based on the total energy released from a maximum credible accident. This accident assumes a rupture of the primary system with the release of virtually all of the available stored thermal energy in the high pressure, high temperature coolant, which generates a large quantity of steam or other vapor from the reactor coolant.

These vapor containers, therefore, represent a substantial portion of the total nuclear plant costs. Because of their size, the vapor containers have a major effect on plant layout and design. Existing practice utilizes large, thin-walled vapor containers in which only a low pressure would be developed by an accident because of the large volume enclosed by the vapor container; or small, thick-walled vapor containers are utilized in which high pressures would be developed by the accident because of the relatively smaller volumes contained by the latter vapor containers. Therefore, a major reduction in the vapor container requirements would result in more flexibility in plant design as well as substantial savings in plant costs.

Accordingly, it is the general object of this invention to provide a novel pressure-suppressing arrangement for a pressurizable enclosure which may be subject to increased pressurization from a release or generation of fluid from a fluid system contained within the enclosure. An ancillary object is the provision of a novel method for suppressing pressure increases in the aforementioned enclosure.

It is a more particular object of this invention to provide a novel pressure-suppressing arrangement for an enclosure, which contains the primary system of a nuclear reactor.

Another object of this invention is to reduce substantially the design pressure and size requirements of a vapor enclosure of a nuclear power plant or other pressurized equipment, and thereby to reduce substantially the total plant costs.

Still another object of this invention, when applied to a nuclear reactor plant, is to utilize biological shielding, normally required for the reactor plant, in the novel construction of the pressure-suppressing arrangement.

Still another object of this invention is to provide a pressure-suppressing scheme which is always ready for immediate action whenever an accident might occur and which does not rely on any external services or on operator control in order to function immediately upon the occurrence of such an accident in the primary system of the nuclear plant.

Still another object of this invention is to utilize less expensive structural material, such as concrete instead of steel, for the vapor enclosure as a result of the lower, maximum pressures that can be credibly anticipated as a result of using a pressure-suppressing system.

Another object of this invention is to provide a sealed enclosure for a nuclear plant in which the volume of the enclosure is determined solely by equipment and biological shielding requirements and not by the volume which would be occupied by accidentally vaporized coolant and/or moderator employed in the plant.

Still another object of this invention is to provide means for condensing substantially all of the condensible vapors that may be released or generated within an enclosure surrounding a nuclear plant or other pressurized equipment.

Briefly, the present invention accomplishes the above cited objects by providing an enclosure within which is disposed an entire nuclear reactor system or other fluid handling equipment from which or in which condensible vapors might be generated or otherwise released to the enclosure. The enclosure is then separated into a number of compartments capable of withstanding pressure by vertical walls within the enclosure. When the invention is applied to a nuclear plant, the reactor and primary loops of the nuclear system are enclosed and separated from one another by the aforementioned compartments. For example, the reactor is enclosed in a reactor compartment, and each primary loop is enclosed in its own respective loop compartment. The bottom area of the enclosure, including the bottom area of each compartment is filled with a liquid such as water. Openings are also formed at the bottom of the vertical walls below the water level normally maintained in the bottom of the enclosure. The distance of the openings below the surface of the liquid will, of course, determine the differential pressures which can be maintained among the various compartments, if desired, prior to release of fluid through the openings to adjacent compartments. Some of the fluid, moreover, in certain instances will be absorbed or contained in the space of the original or normal pool, from which liquid has been displaced by the escaping fluid, to provide a certain amount of pressure suppression. The aforementioned openings are utilized to couple adjacent compartments. A distribution grid is also located below the water level and above the aforementioned openings in each of the compartments. One example of such grid is a horizontal plate having evenly spaced and uniformly sized holes drilled through the grid. Each grid spans the entire bottom area within its associated compartment.

The material used for the enclosure and the vertical walls separating the compartments is desirably any good shielding material such as concrete. The vertical walls also provide shielding for each of the individual compartments. Therefore in certain applications of the invention, if sufficient shielding is provided in the vertical walls forming the compartments, maintenance work can be performed on the loop isolated by stop valves from a multiloop system even though the remainder of the nuclear reactor system is still in operation.

In case of an accident in which pressurized, high temperature equipment, such as the aforementioned primary reactor system, ruptures within one of the compartments such as the reactor compartment, the high pressure, high temperature fluid within the primary system escapes into the reactor compartment. The fluid, for example water, then flashes into vapor, for example steam, which fills the reactor compartment. As the steam fills the reactor compartment, a pressure buildup occurs, which starts to force the level of the liquid, for example water, in the bottom of the reactor compartment in a downward direction and into the outer or loop compartments surrounding the reactor compartment. After the water level has fallen below the reactor compartment distribution grid, the steam-air mixture will flow laterally through the vent openings into the adjacent loop compartments. The steam-air mixture then passes upwardly through the distribution grids in the loop compartments. The majority of the steam condenses in the water above the distribution grid, but some of the steam condenses in the region below the distribution grid with the amount of condensation decreasing as the water in this space is displaced by air and uncondensed steam and is heated by the condensed steam.

The non-condensible vapors, such as the aforementioned air, bubble through the water in the loop compartments, are scrubbed and cooled in the process, and then enter a vapor space located above the pool of water in each of the loop compartments. The pressure in each vapor space then builds up until a maximum pressure is reached among all the vapor spaces in each of the outer or adjacent compartments of the enclosure and in the reactor compartment, which is substantially below the pressure that would have been attained without utilizing the pressure suppressing arrangements of the invention to condense some or all of the vapor. Also, the distribution grid has been so designed as to provide sufficient resistance to the steam-air flow through the grid to obtain lateral movement of the steam-air mixture underneath the distribution grid, so as to obtain more uniform percolation of the steam-air mixture through the water above the distribution grid over the entire area of the grid. Also, the depth of the water pool above the grid is such that all or substantially all of the steam passing through the pool is condensed.

If the rupture occurs in one of the outer or loop compartments, the flow of first the water maintained at the bottom of the enclosure and then of the steam-air mixture is from the outer compartment, in which the rupture has occurred, into the reactor and other adjacent or outer compartments in the manner described above.

It can, therefore, readily be seen that after an accident has occurred within one of the compartments, the pressure within that particular compartment is maintained at a low level by the condensation of steam or absorption of the escaping fluid within the pool of liquid maintained at the bottom of the enclosure and by conducting the air and other non-condensible gases to an unoccupied but enclosed volume within the other compartments. Therefore, the present invention accomplishes the above cited objects.

Further objects and advantages of the invention will become apparent as the following description proceeds; and features of novelty which characterize the invention, will be pointed out in particularity in the claims annexed to and forming a part of this specification.

Figure 2:
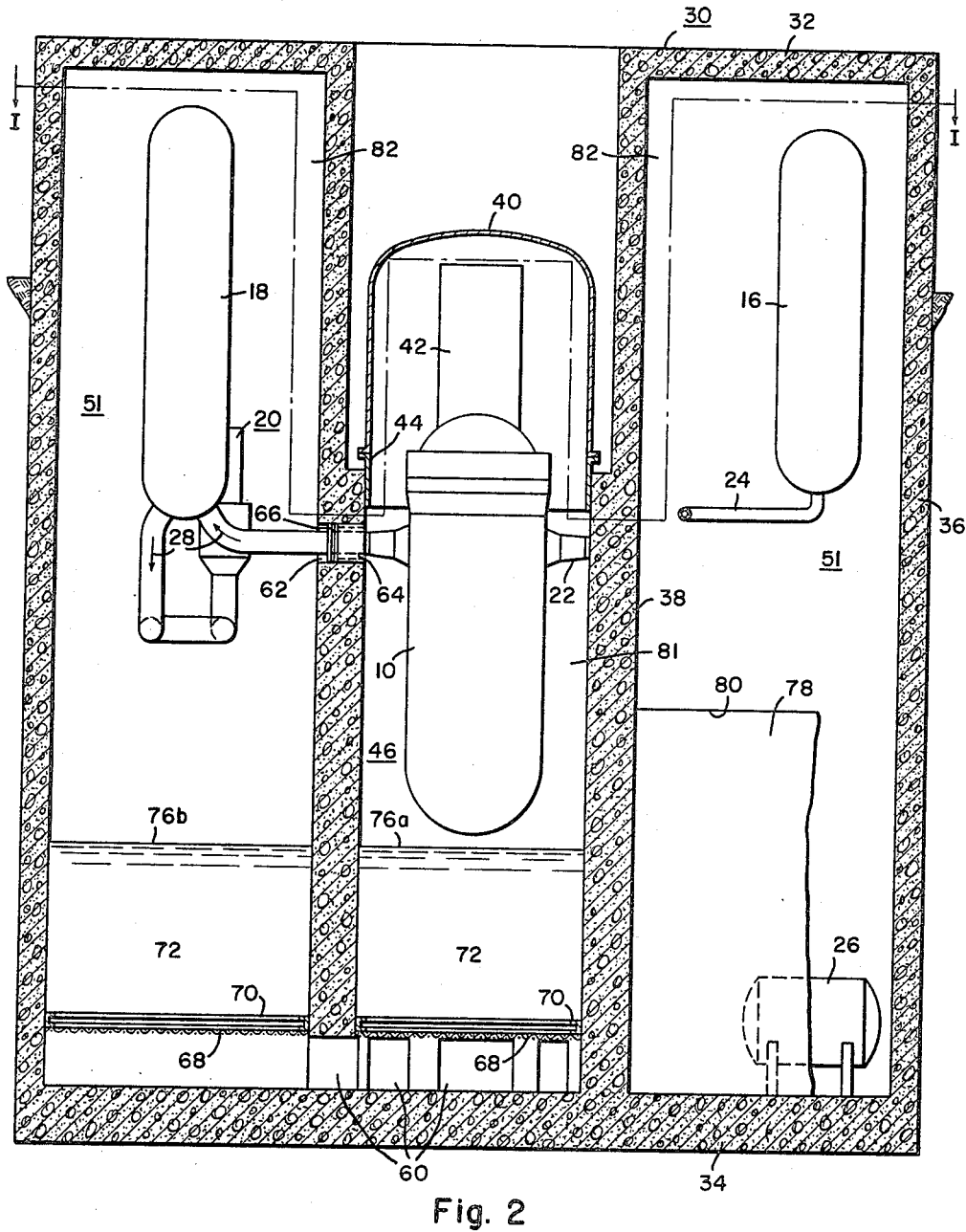

For a better understanding of the invention, references may be had to the accompanying drawings, in which:

FIGURE 1 is a cross-sectional view of the pressure-suppressing arrangement shown in FIG. 2 and taken along reference line I—I thereof; and FIG. 2 is a vertical section through a pressure-suppressing arrangement according to the invention and taken through a loop compartment, through the reactor compartment and at the edge of the pressurizer compartment along reference line II—II thereof.

Referring now to FIGURES 1 and 2 of the drawings, an illustrative example of a pressure-suppressing system adapted for use with a nuclear power plant is depicted therein. The nuclear reactor primary system in this arrangement comprises a reactor 10, four primary coolant loops 11a through 11d, a pressurizer 16, and a pressurizer relief tank 26.

Each of the four primary coolant loops 11a through 11d comprises a vapor or steam generator 18, a primary coolant pump 20, and primary coolant piping 22, which couples the vapor generator 18 and the primary coolant pump 20 to the reactor 10. The pressurizer 16 is coupled to one of the primary coolant loops, such as loop 11a, by a pressurizer pipe 24. Located below the pressurizer 16 is the pressurizer relief tank 26. The pressurizer 16 is coupled to the pressurizer relief tank 26 by piping (not shown).

Although, in this example, the four primary coolant loops 11a through 11d are coupled to the reactor 10, a greater or lesser number of such loops can be employed as required. In addition, the four loops 11a through 11d and the pressurizer 16 are located in such a manner as to surround the reactor 10. However, other locations can be chosen; for example, two loops can be placed on one side of the reactor 10 and the other two loops can be placed on the diametrically opposite side of the reactor 10. For this invention, the radial arrangement of the four loops 11a through 11d, as depicted in FIGURE 1 of the drawings, is the preferred arrangement in that the interconnecting piping 22, which couples each loop to the reactor 10, can be simplified and kept to a minimum as compared to any other arrangement.

The primary fluid or coolant flow within the reactor primary system is indicated by flow arrows 28. In each of the four loops 11a through 11d, the flow is from the reactor 10 to the steam generator 18, from the steam generator 18 to the primary coolant pump 20, and from the primary coolant pump 20 back to the reactor 10. Also, as is well known, the pressurizer 16 is used to minimize the pressure transients which may occur within the primary system. Furthermore, if there is a pressure build-up within the primary system which in turn causes a pressure build-up within the pressurizer 16, the pressurizer 16 can discharge the primary fluid into the pressurizer relief tank 26 in order to minimize the pressure increase within the primary system and the pressurizer 16.

The entire reactor primary system previously described is contained within an annular enclosure 30. In this specification, the term "annular" is not to be restricted to a member having inner and outer circular peripheries but is also intended to include a member with inner and outer peripheries having a configuration other than circular. The enclosure 30 comprises a roof 32, a floor 34, an outer vertical wall 36, an inner vertical wall 38, and a reactor dome 40. The roof 32 is annularly shaped and has a central opening over the reactor 10. The floor 34 is circularly shaped and covers the entire area occupied by the reactor primary system. The outer vertical wall 36 is annularly shaped, extends from the floor 34 to the roof 32, and is located at the outer peripheries of the floor 34 and the roof 32. The inner vertical wall 38 extends from the floor 34 upwardly to the roof 32 and surrounds the reactor 10, which is located in the center of the enclosure 30.

Disposed between the inner wall 38 and the outer wall 36 are the loops 11a through 11d and the pressurizer 16. The reactor dome 40 encloses the space above the reactor 10 occupied by the control rod drive mechanism, as indicated by the reference character 42. Therefore, the reactor dome 40 and the lower half of the inner vertical wall 38, to which the reactor dome 30 is suitably secured by means of a dome sleeve 44 which couples the reactor dome 40 to the inner vertical wall 38, form a reactor compartment 46 within which the reactor 10 is disposed. It is to be understood, however, that the reactor dome 40 and the dome sleeve 44 could have been eliminated by extending the roof 32 over the reactor compartment 46. In this example, however, the reactor dome 40 has been used in order to simplify the refueling procedure, which will not be explained as it does not constitute part of this invention.

The reactor dome 40 and the dome sleeve 44 are constructed of a metal such as carbon steel. However, the remainder of the enclosure 30 is constructed from concrete, reinforced concrete, or concrete densified with barytes so that the enclosure can serve as an effective biological shield for the reactor primary system.

Radial vertical walls 48 extend upwardly from the floor 34 to the roof 32 and extend radially from the inner vertical wall 38 to the outer vertical wall 36 so as to form loop compartments 51a through 51d inclusively. Radial vertical wall 50 is similar to the radial vertical walls 48 and separates the primary coolant loop 11d from a dry sump 56, to be described hereinafter, in which is located the pressure relief tank 26.

Within each loop compartment 51 is disposed a primary coolant loop 11. At the bottom of each radial vertical wall 48 is formed at least one vent opening 58 which couples adjacent loop compartments 51. At the bottom of the inner vertical wall 38 there is also at least one vent opening 60, which couples the reactor compartment 46 to each of the loop compartments 51. Also the inner vertical wall 38 has a plurality of pipe openings 62 at its mid-height, which couple the reactor compartment 46 with each of the loop compartments 51. A primary coolant pipe 22 passes through each of the openings 62. In each of the openings 62 is suitably secured to the inner vertical wall 38 a sleeve 64 (FIG. 2). A bellows joint 66 is then sealably secured, by any well known means such as welding, to the sleeve 64 and the primary coolant pipe 22. The bellows joint 66, which is slidably inserted in the opening 62, permits the primary coolant piping 22 to expand and contract so as to keep piping stresses to a minimum and also provides a pressure tight seal at each opening 62 between the reactor compartment 46 and each loop compartment 51.

A distribution grid 68 is disposed in the lower portion of each of the loop compartments 51 and in the lower portion of the reactor compartment 46. Each distribution grid 68 is located immediately above the vent openings 58 and 60. Each distribution grid 68 is securely fastened to the underside of its associated channel steel frame 70 which provides support and rigidity to the distribution grid 68. The steel frame-work 70, in turn, is fastened to the vertical walls 36, 38, 48 and 50. In one example, the grid 68 comprises a horizontal plate with uniformly sized holes that are evenly spaced. A heavy screen can also be used as a distribution grid. Each grid is horizontally positioned and extends over the entire area of its associated loop compartment 51 or reactor compartment 46.

A pool of liquid 72 (FIG. 2) is maintained in the lower portion of the entire enclosure 30, except in a dry sump 74 to be described hereinafter. The water in the pool 72 is maintained at a level 76 throughout the bottom of the enclosure 30, except in dry sump 74. The level 76 is maintained below the reactor 10 but of sufficient depth to keep the vent openings 58 and 60 in a submerged condition. A sufficient quantity of water is maintained within the enclosure 30 to absorb the heat energy in any amount of primary coolant that might escape from the reactor primary system into the enclosure 30, so as to maintain the resulting pressure within the enclosure 30 below a predetermined amount.

Returning now to the dry rump 74, a rump wall 78 extends radially from the inner vertical wall 38 to the outer vertical wall 36 and extends upwardly from the floor 34 to a top level 80. The sump wall 78 is disposed within the loop compartment 51a adjacent the pressurizer relief tank 26. Thus, the pressurizer relief tank 26 is contained between the sump wall 78 and the radial vertical wall 50. The top level 80 of the sump wall 78 is located at a sufficient height to prevent the overflow of any of the liquid from the pool 72 into the dry sump 74, even though the liquid from some other compartment is forced into the loop compartment 51a. Therefore, a dry area at the bottom of the enclosure 30 can be maintained for the installation of equipment at a low level in the plant if required.

From the aforementioned description, it can be readily ascertained that the reactor 10 and the primary coolant loops 11 are enclosed and separated from one another by pressure tight loop compartments 51 and by a pressure tight reactor compartment 46. Therefore, pressurized vapor which escapes into one of the compartments 46 or 51 will cause that specific compartment to be pressurized. This in turn will cause the water in the liquid pool 72 to be forced downwardly through the distribution grid 68 and through the vent openings 58 and 60 into the other compartments. The pressurized vapor then follows the water into the other compartments and is cooled and condensed by the water, as the condensible vapor passes through the aforementioned water. Therefore, the overall pressure within the enclosure 30 is distributed among all of the compartments 46 and 51 and is also reduced by the cooling and condensing of the condensible vapor as it passes through the water.

In operation, it is first assumed that a rupture has occurred in some point in the primary coolant piping 22; for example in the piping within the reactor compartment 46. The high pressure, high temperature primary coolant, which in this example is pressurized water, flows from the rupture in the primary coolant piping 22 into the reactor compartment 46. Upon entering the reactor compartment 46 the pressurized high temperature water flashes into steam. The pressure within the reactor compartment 46 then builds up and forces the level of the water in the pool 72 in a downwardly direction through the distributing grid 68, through the reactor compartment vent openings 60, and into the loop compartments 51. Thus, the level 76a of the water in the reactor compartment 46 drops as the level 76b of the water in the loop compartments 51 rises. The steam-air mixture then flows through the pool 72 of water or through the space where the water in the pool 72 was contained, as the water may be partially or entirely forced out of the reactor compartment 46 ahead of the steam-air flow mixture. After the water level in the reactor compartment 46 falls below the distribution grid 68, the steam-air mixture flows laterally through the reactor compartment vent openings 60 into the loop compartments 51. The steam-air mixture then flows upwardly through the distribution grids 68 in the loop compartments 51 into the liquid in the pool 72.

The purpose of the distribution grid 68 is to obtain uniform percolation of the steam through the water disposed above the grid 68 over the entire area of the grid 68. The distribution grid 68 is designed to provide sufficient resistance to the steam flow through the grid 68 to obtain lateral movement of the steam underneath the grid. Without the aforementioned grid 68, the steam would heat only the water in the areas directly adjacent the reactor compartment vent openings 60 through which the steam flowed from the reactor compartment 46. Therefore, when the water in these localized areas reached the saturation temperature, the steam would pass through the water without condensing. The distribution grid 68, however, increases the interface area between the steam and the water through which the steam flows and thus utilizes substantially all of the water above the grid 68 for cooling and condensing the steam. Therefore, with a water pool of sufficient depth, all of the steam released from the primary system is condensed in the water pool.

A secondary purpose of the distribution grid 68 is to break the vaporized primary coolant flow passing through the grids 68 into small sized bubbles, so as to enhance the heat transfer for condensation of the steam in the liquid above the distribution grids 68. In addition, some of the steam condenses in the region below the distribution grids 68, but the amount of condensation decreases as the water in the aforementioned area is replaced by the steam and as the process continues. Also, the amount of air in the steam-air mixture leaving the compartment, in which the rupture occurred, decreases as the process continues.

As the steam from the steam-air mixture condenses in the water above the distribution grid 68, the air and any other non-condensible vapors are cooled and simultaneously scrubbed of particulate matter as they pass through the water in the pool 72. The cooled and scrubbed air then flows from the pool 72 into the air space 82 in the loop compartments 51 above the pool 72.

As the air and any other non-condensible vapors flow into the air space 82 above the pool 72 in the loop compartments 51, the pressure in each loop compartment 51 increases until a maximum pressure below the design pressure of each compartment is reached. The design pressure, which is desirably held to a minimum, is a function of the vapor space 81 in the reactor compartment 46 and the vapor spaces 82 in the loop compartments 51, the depth of the liquid in the pool 72, the flow resistance of the grid 68 to the steam-air mixture, and the rate of primary coolant discharge from the primary system. The vapor spaces 82 that have been utilized for this purpose can be any convenient unoccupied volume, which is designed or modified to withstand a pressure derived from an accident in the nuclear portion of the plant. In the aforementioned example, a rupture was assumed in the primary coolant piping 22 allowing the high pressure, high temperature primary coolant to escape from the primary system into the reactor compartment 46.

At any instant, the pressure differential between the reactor compartment 46 and the loop compartments 51 equals the sum of the inertial forces required to accelerate the water moved at the bottom of the enclosure 30, the flow resistance of the distribution grid 68 in the reactor compartment 46 to the steam-air mixture, the flow resistance of the distribution grids 68 in the loop compartments 51 to the steam-air mixture, and the head of water between the level in the loop compartments 51 and the level in the reactor compartment 46.

If the rupture occurs in one of the loop compartments 51, the flow of water and then the steam-air mixture is from the compartment in which the rupture occurs into the reactor compartment 46 and the other loop compartments 51.

While there have been shown and described what are at present considered to be the preferred embodiments of the invention, modifications thereto will readily occur to those skilled in the art. For example, pipe or duct work can be used in certain applications to couple the center or extreme ends of one compartment to the center or most distant points in the other compartments, so as to disribute the steam from the compartment in which a rupture has occurred to the other compartments in which the steam is to be condensed. Such pipes can be installed below the distribution grids 68; or the pipes can couple the vapor space 82 in one loop compartment 51 to the space below the distribution grid 68 at the most extreme end of another loop compartment 51 or in the reactor compartment 46. Also, the pressurizer relief tank 26 can be mounted in other applications at some location above the level 76 of the liquid pool 72, so as to make it possible to eliminate the sump wall 78 and to provide additional loop compartment vent openings in the lower portion of the radial vertical wall 50 which at present is solid from top to bottom.

It is not desired, therefore, that the invention be limited to the specific arrangements shown and described; rather, it is intended to cover in the appended claims all such modifications as fall within the true spirit and scope of the invention.

Accordingly, what is claimed as new is:

1. A pressure-suppressing arrangement comprising a plurality of adjacent pressure tight compartments having a nuclear reactor vessel and related pressurized fluid-handling equipment disposed therein respectively and from which a pressurized fluid may escape, means for providing open communication between said adjacent compartments, a pool of liquid disposed in each of said compartments and having a level above said communicating means, said liquid being separate from said fluid and partially filling at least one of said compartments, a distribution grid in each of said compartments submerged in said liquid pool and positioned above said communicating means to distribute said fluid more intimately with said liquid in said pool, so as to maximize the condensation of the condensible vaporized portion of said fluid and so as to maximize the scrubbing and the cooling of the non-condensible vaporized portion and the liquid portion of said fluid.

2. A pressure-suppressing arrangement comprising a plurality of closed compartments having a nuclear reactor vessel and related pressurized fluid handling components disposed therein and from which a pressurized expansible fluid may escape, a pool of liquid disposed at the bottom of and partially filling each of said compartments, said liquid being separate from said fluid, open means below the level of said liquid for freely relieving said escaped fluid and said liquid from any one compartment to the remainder of said compartments, and means above said open means and submerged in said liquid within each of said compartments for mixing said escaped fluid with said liquid.

3. The combination of claim 1 wherein each of said adjacent compartments have at least one common wall and are coupled by at least one opening through each of the common walls, said opening being at the bottom of the common wall and at substantially the same elevation as all other common wall openings.

4. The combination of claim 3 wherein each of said distribution grids extends across the entire horizontal area of its respective compartment so as to maximize the mixing of said fluid and said liquid therein.

5. A pressure-suppressing arrangement comprising a plurality of closed compartments capable of containing pressurized fluid-handling equipment with at least one of said compartments having disposed therein a nuclear reactor vessel from which an expansible fluid may escape, a pool of liquid disposed at the bottom portion of each of said compartments, said liquid being separate from said fluid and only partially filling at least one of said compartments, and open means below the level of said liquid for freely relieving said escaped fluid and said liquid from any one compartment to the remainder of said compartments.

6. A pressure-suppressing arrangement comprising a plurality of closed compartments with at least one of said compartments having a nuclear reactor vessel disposed therein and from which a pressurized fluid may escape, a pool of liquid disposed in said one compartment, said liquid being separate from said fluid, and open communicating means below the level of said liquid and in the lower portion of said one compartment for freely relieving said escaped fluid and said liquid from said one compartment to the remainder of said compartments.

7. The combination of claim 6 wherein said pool of liquid is disposed in and only partially fills the remainder of said compartments.

8. The combination of claim 6 wherein said open communicating means are disposed at the bottom of each of said compartments.

References Cited by the Examiner
UNITED STATES PATENTS

| | | | |
|---|---|---|---|
| 648,586 | 5/1900 | Brunel | 165—144 X |
| 1,875,608 | 9/1932 | Huntemuller | 122—37 X |
| 1,993,725 | 3/1935 | Walker et al. | 122—37 X |
| 2,208,352 | 8/1940 | Pichler-Tennenberg | 137—247 |
| 2,796,396 | 6/1957 | Szilard | 204—154.2 |
| 2,841,545 | 7/1958 | Zinn | 204—193.2 |
| 2,843,539 | 7/1958 | Barnstein | 204—154.2 |
| 2,995,505 | 8/1961 | Guild. | |
| 3,022,238 | 2/1962 | Kolflat | 204—193.2 |
| 3,052,615 | 9/1962 | Johns et al. | 204—193.2 |
| 3,100,965 | 8/1963 | Blackburn | 60—54.5 |
| 3,115,450 | 12/1963 | Schanz | 176—38 |
| 3,149,046 | 9/1964 | Boyd | 176—53 |

FOREIGN PATENTS

| | | |
|---|---|---|
| 586,607 | 5/1960 | Belgium. |
| 1,164,429 | 5/1958 | France. |
| 929,941 | 6/1963 | Great Britain. |

OTHER REFERENCES

C & E News, vol. 39, No. 28, July 10, 1961, pp. 21 and 22.

Power, September 1955, pp. 75–81.

L. DEWAYNE RUTLEDGE, *Primary Examiner.*

CARL D. QUARFORTH, *Examiner.*

R. C. LYNE, *Assistant Examiner.*